(12) United States Patent
Schmid

(10) Patent No.: US 7,334,526 B2
(45) Date of Patent: Feb. 26, 2008

(54) METHOD FOR SECURING A LAMINATED CORE FOR THE STATOR WINDING OF A LINEAR MOTOR TO THE TRACK

(75) Inventor: Robert Schmid, Neunkirchen am Brand (DE)

(73) Assignee: Siemens Aktiengesllschaft, Munich (DE)

( * ) Notice: Subject to any disclaimer, the term of this patent is extended or adjusted under 35 U.S.C. 154(b) by 316 days.

(21) Appl. No.: 11/075,914

(22) Filed: Mar. 10, 2005

(65) Prior Publication Data

US 2005/0198801 A1 Sep. 15, 2005

(30) Foreign Application Priority Data

Mar. 11, 2004 (DE) .................. 10 2004 012 049

(51) Int. Cl.
*B60L 13/00* (2006.01)
*B21D 39/03* (2006.01)

(52) U.S. Cl. ........................................ 104/290; 29/428

(58) Field of Classification Search ................ 104/281, 104/283, 286; 29/428, 602.1, 607
See application file for complete search history.

(56) References Cited

FOREIGN PATENT DOCUMENTS

| DE | 25 59 357 C2 | 7/1977 | |
|---|---|---|---|
| DE | 10301276 | * | 1/2003 |
| DE | 102 53 136 A1 | 5/2004 | |
| DE | 102 57 340 A1 | 6/2004 | |
| DE | 103 01 276 A1 | 7/2004 | |
| WO | WO 2004/044329 A1 | 5/2004 | |
| WO | WO 2004/053231 A1 | 6/2004 | |
| WO | WO 2004/067844 A2 | 8/2004 | |

* cited by examiner

*Primary Examiner*—S. Joseph Morano
*Assistant Examiner*—Robert J. McCarry, Jr.
(74) *Attorney, Agent, or Firm*—Harness, Dickey & Pierce, P.L.C.

(57) ABSTRACT

A method is for securing a laminated core, used to accommodate the stator winding of a linear motor, to a track. In particular, the track is for a magnetic levitation transport system. Provision is made for an installation module to be connected to the track and to have at least one pair of holes then aligned transversely with respect to the direction of travel in parallel, uncovered side walls. The laminated core, in which there is at least one channel, is then inserted into the installation module in a manner held by a clamping device until the at least one channel in the laminated core forms a continuous opening with the at least one pair of holes. A tube is then pushed into this opening and fixed there. The clamping device is then removed.

16 Claims, 3 Drawing Sheets

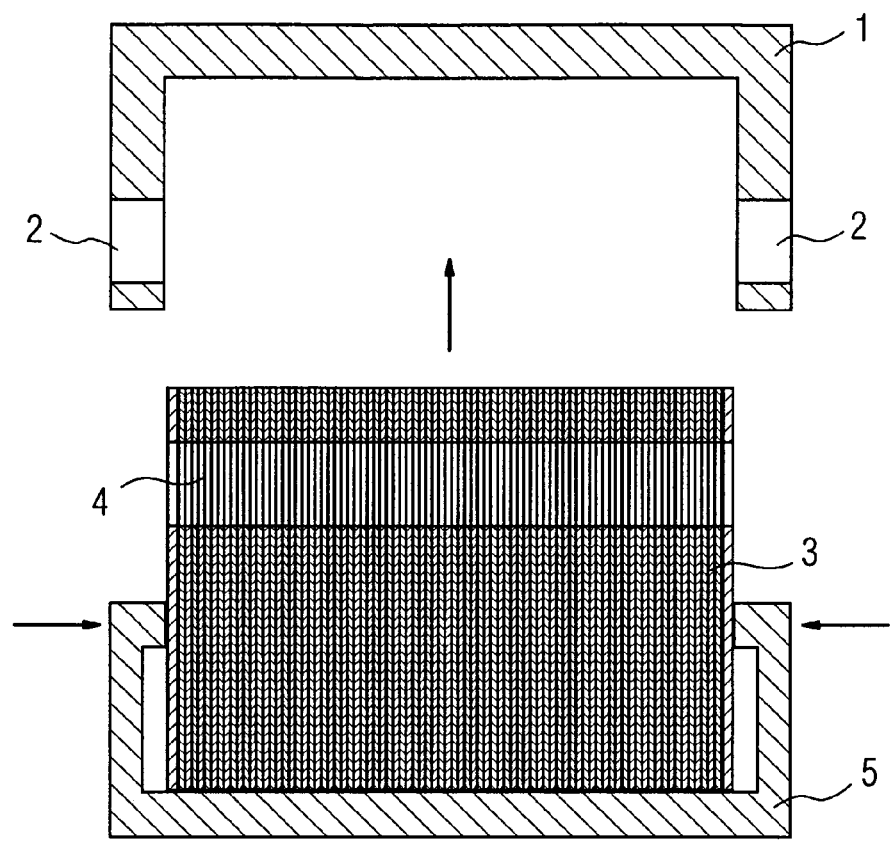
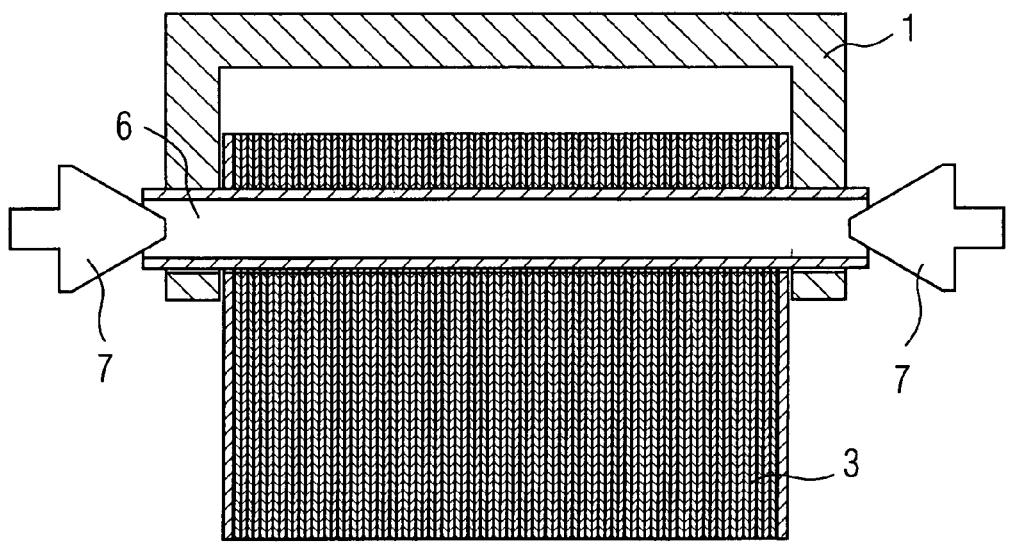

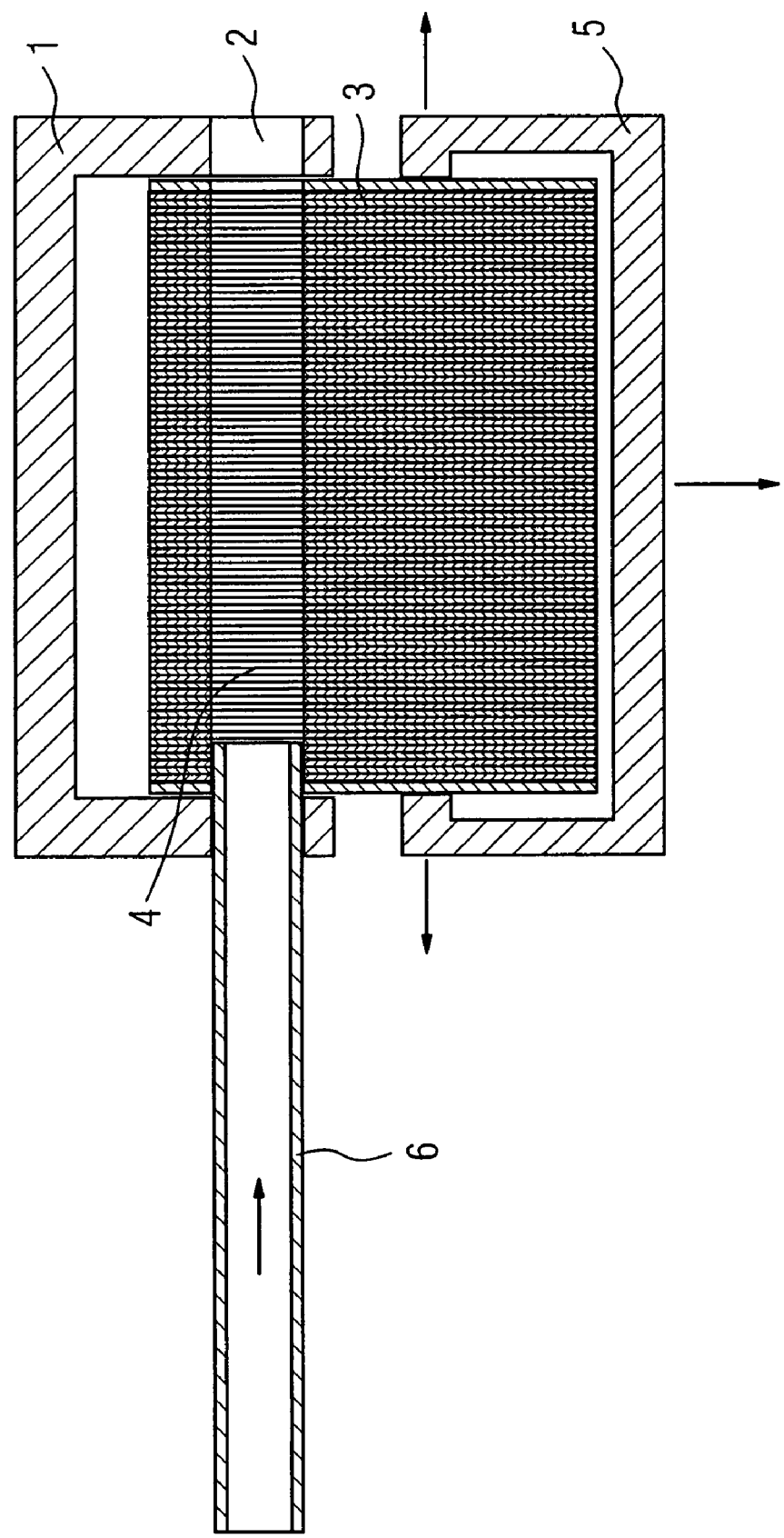

METHOD FOR SECURING A LAMINATED CORE FOR THE STATOR WINDING OF A LINEAR MOTOR TO THE TRACK

The present application hereby claims priority under 35 U.S.C. §119 on German patent application numbers DE 10 2004 012 049.8 filed Mar. 11, 2004, the entire contents of which is hereby incorporated herein by reference.

FIELD OF THE INVENTION

The invention generally relates to a method for securing a laminated core, which is used to accommodate the stator winding of a linear motor, to a track which is, in particular, a track for a magnetic levitation transport system.

BACKGROUND OF THE INVENTION

In a linear motor which is suitable for a magnetic levitation transport system, for example, the stator is arranged on the track. This stator includes a laminated core with transverse slots which accommodate the stator winding. The laminated cores are usually divided into segments so that they can be produced cost-effectively, but in particular so that they can be transported easily and attached to the track in a simple manner. It is necessary to secure the laminated cores which are arranged in series to the track in a cost-effective but nevertheless reliable manner. Accidents could occur if a laminated core should become detached from its mount to such an extent that a vehicle can hit the laminated core.

To date, it has been customary to prefabricate the individual laminated cores by the individual laminates having been baked with a varnish or cast in epoxy resin, this at the same time providing corrosion protection.

To date, bolts or so-called sliding blocks which engage in the laminated cores on the one hand and in the track on the other have been used in order to secure the individual laminates which have already been assembled to form a laminated core. Adjustable securing elements, for example screws, have also already been proposed in order to compensate for manufacturing tolerances. The known method for securing a laminated core to the track is complicated. In particular, manufacturing tolerances can only be eliminated using complex devices/methods.

SUMMARY OF THE INVENTION

An embodiment of the invention is based on an object of specifying a simple but nevertheless reliable method for securing a laminated core to a track, it being possible to carry out this method with few working steps and thus in a cost-effective manner.

According to an embodiment of the invention, an object may be achieved by an installation module connected to the track and including at least one pair of holes then aligned transversely with respect to the direction of travel in parallel, uncovered side walls. Further, the laminated core, in which there is at least one channel, may then be inserted into the installation module in a manner held by a clamping device until the at least one channel in the laminated core forms a continuous opening with the at least one pair of holes. A tube may then be pushed into the opening and fixed there. The clamping device may then be removed.

An advantage achieved with the method according to an embodiment of the invention may be that the laminated core is connected to the installation module as a laminate stack which is held together in the clamping device, and not as an integral component, as a result of which manufacturing tolerances can be compensated for more effectively. Furthermore, the insertion and fixing of the tube provide a fast and reliable method for securing the laminated core.

For example, cavities in the laminated core are filled with insulating material after it has been installed in the installation module. This has the advantage that any possible cavities in the laminated core can be completely filled such that a monolithic element is formed.

The cavities between the laminates of the laminated core may, for example, be filled with insulating material using a vacuum method.

The laminated core is, for example, varnished. This provides corrosion protection.

In order to be fixed, the tube is, for example, bent upward outside the opening in the installation module.

According to another example, in order to be fixed, the tube is widened in the region of the ends of the opening by means of a mandrel. The mandrel is, for example, inserted into the tube and removed again.

At least in its end region, the tube is thereby pressed against the installation module or even bent outside the installation module, this producing stable fixing.

For more effective insertion of the tube, the tube has, for example, a somewhat smaller diameter than the opening.

In order to prevent the tube from easily springing back when, in particular, said tube is bent upward by means of a mandrel, the tube has, for example, a noncircular cross section without corners.

One particularly suitable cross section is a cloverleaf-shaped cross section. If, in this case, the inwardly directed rounded portions are pressed outward by means of a mandrel, the rounded portions may be moved beyond a dead center position in the same way as a toggle lever. The outwardly directed rounded portions then bear against the walls of the continuous opening in the installation module and laminated core at a constant pressure.

According to another example, the tube has a larger diameter than the opening and longitudinal slots, and is pressed into the opening in order to be fixed. This can be done particularly easily through the slots.

For example, a rod is placed into the tube in order to retain the laminated core if the tube breaks. This advantageously provides a redundant mount. This is because the inner wall of the channel in the laminated core initially rests on the rod and the laminated core cannot fall out of the installation module if the tube fails.

For example, the diameter of the rod is considerably smaller than the diameter of the opening in the tube, in order to detect displacement of the laminated core owing to a fault in the tube. This has the advantageous result that the associated laminated core protrudes out of the plane of the laminated cores to a certain extent when there is a fault in the tube, so that it is immediately possible to detect that a repair is necessary.

The method for securing a laminated core according to an embodiment of the invention particularly provides the advantage that a stator of a linear motor is secured to a track in a fast and reliable manner and furthermore in a redundant manner.

BRIEF DESCRIPTION OF THE DRAWINGS

One exemplary embodiment of the inventive method for securing a laminated core to the track, which is used to accommodate the stator winding of a linear motor, is explained in greater detail with reference to the drawings:

FIGS. 1 to 4 show the successive steps for securing the laminated core to the track.

DETAILED DESCRIPTION OF THE EXEMPLARY EMBODIMENTS

Figure 4:
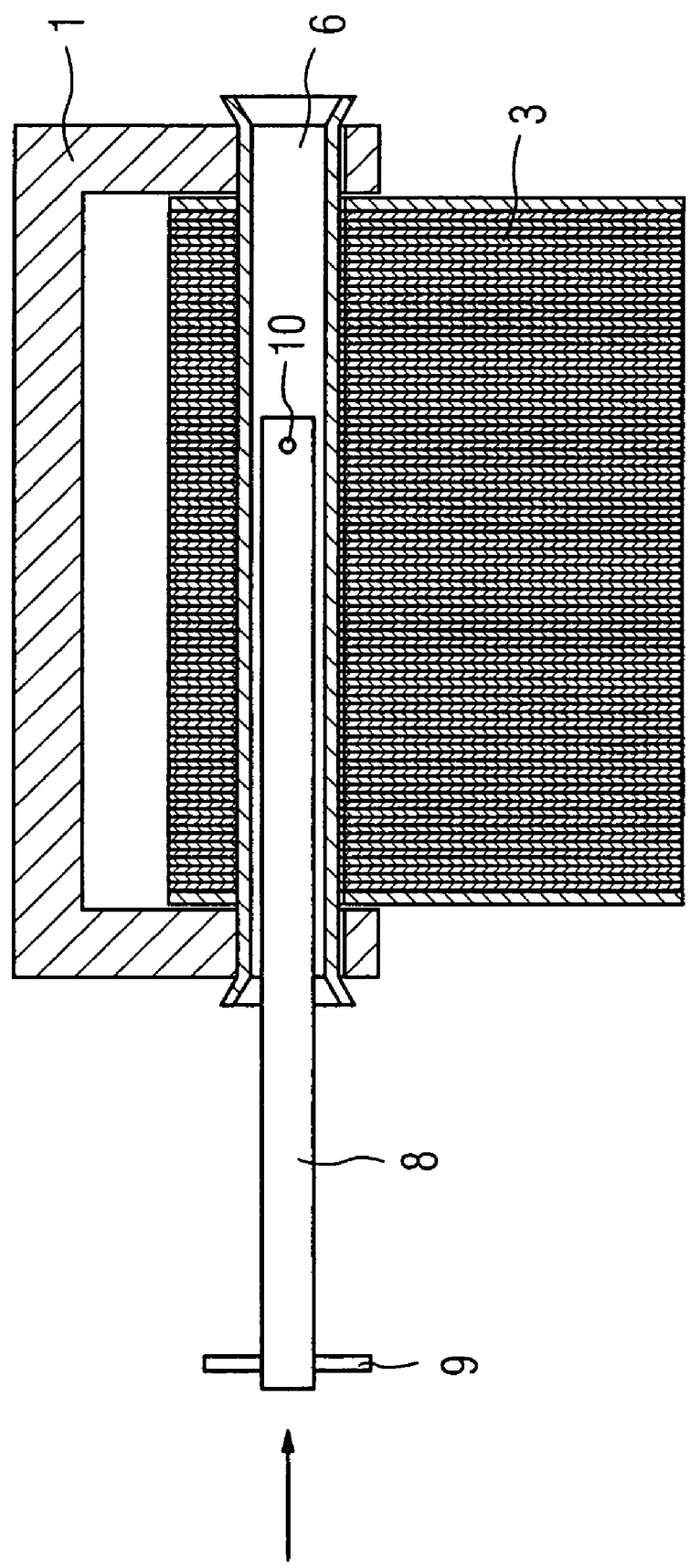

In a magnetic levitation transport system which is driven by a linear motor, the stator is arranged on the track. The stator has a stator winding on a laminated core 3. The track includes a concrete structure. The stator is held in an installation module 1 which is secured beneath the concrete structure. The installation module 1 is in the shape of a box which is open at the base and has pairs of holes 2 in the side walls. The pairs of holes 2 are aligned with one another transversely with respect to the direction of travel. The laminated core 3 has channels 4 which are arranged such that they in each case form a continuous opening with a pair of holes 2 after the laminated core 3 is inserted into the installation module 1.

In order to secure the laminated core 3 in the installation module 1, the laminated core 3 is initially held together by a clamping device 5.

In FIG. 1, the laminated core 3 with the clamping device 5 is still outside the installation module 1.

FIG. 2 shows the laminated core 3 having been pushed into the installation module 1 by means of the clamping device 5 such that the channel 4 in the laminated core 3 forms a continuous opening with the pair of holes 2 in the installation module 1. In FIG. 2, a tube 6 whose purpose is to hold the laminated core 3 in the installation module 1 is pushed into this continuous opening.

In FIG. 3, the tube 6 is in its intended position and the clamping device 5 has already been removed. Prior to the clamping device 5 being removed, the tube 6 was fixed in the installation module 1. For this purpose, the tube 6 has been bent upward outside the pair of holes 2 in the installation module 1 by way of a mandrel 7 in each case.

In FIG. 4, additional device(s) for retaining the laminated core 3 in the installation module 1 are provided. To this end, a rod 8 in placed into the tube 6. In FIG. 4, the rod 8 has not yet been fully inserted. Transverse pins 9 which can be inserted into holes 10 at the ends of the rod 8 prevent the rod 8 from slipping out once inserted.

The diameter of the rod 8 is considerably smaller than the diameter of the opening in the tube 6. If the tube 6 breaks, the rod 8 takes over its function and holds the laminated core 3 in the installation module 1. At the same time, however, the laminated core 3 slides downward to some extent, so that where a repair is necessary is immediately apparent upon inspection.

The method according to an embodiment of the invention can be carried out in a fast and cost-effective manner and in particular also permits straightforward monitoring of the linear motor.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for securing a laminated core, used to accommodate the stator winding of a linear motor to a track, the method comprising:
    connecting an installation module to the track, the installation module including at least one pair of holes aligned transversely with respect to the direction of travel in parallel, uncovered side walls;
    inserting the laminated core, including at least one channel, into the installation module in a manner held by a clamping device until the at least one channel in the laminated core forms a continuous opening with the at least one pair of holes;
    pushing a tube into the opening and fixing the tube; and
    removing the clamping device.

2. The method as claimed in claim 1, wherein cavities in the laminated core are filled with insulating material.

3. The method as claimed in claim 1, wherein the laminated core is varnished.

4. The method as claimed in claim 1, wherein, in order to be fixed, the tube is bent upward outside the openings.

5. The method as claimed in claim 1, wherein, in order to be fixed, the tube is widened in the region of the openings by use of a mandrel.

6. The method as claimed in claim 1, wherein the tube includes a noncircular cross section without corners.

7. The method as claimed in claim 6, wherein the tube includes a cloverleaf-shaped cross section.

8. The method as claimed in claim 1, wherein the tube includes a larger diameter than the opening and longitudinal slots, and wherein the tube is pressed into the opening in order to be fixed.

9. The method as claimed in claim 1, wherein a rod is placed into the tube in order to retain the laminated core if the tube fails.

10. The method as claimed in claim 9, wherein the diameter of the rod is considerably smaller than the diameter of the opening in the tube, in order to detect displacement of the laminated core owing to a fault in the tube.

11. The method as claimed in claim 1, wherein the track is a track for a magnetic levitation transport system.

12. The method as claimed in claim 1, wherein the laminated core is varnished.

13. The method as claimed in claim 2, wherein, in order to be fixed, the tube is bent upward outside the openings.

14. The method as claimed in claim 2, wherein, in order to be fixed, the tube is widened in the region of the openings by use of a mandrel.

15. The method as claimed in claim 3, wherein, in order to be fixed, the tube is bent upward outside the openings.

16. The method as claimed in claim 3, wherein, in order to be fixed, the tube is widened in the region of the openings by use of a mandrel.

* * * * *